United States Patent
Viola et al.

(10) Patent No.: US 7,031,499 B2
(45) Date of Patent: Apr. 18, 2006

(54) OBJECT RECOGNITION SYSTEM

(75) Inventors: Paul A. Viola, Brookline, MA (US); Michael J. Jones, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 669 days.

(21) Appl. No.: 10/200,726

(22) Filed: Jul. 22, 2002

(65) Prior Publication Data

US 2004/0013286 A1   Jan. 22, 2004

(51) Int. Cl.
  G06K 9/00   (2006.01)
  G06K 9/62   (2006.01)

(52) U.S. Cl. .................. 382/118; 382/190; 382/209

(58) Field of Classification Search ............. 382/115, 382/118, 123, 130, 170, 172, 190, 209, 218, 382/260; 902/3; 348/77; 340/5.53, 5.83, 340/5.81; 345/418
See application file for complete search history.

(56) References Cited

U.S. PATENT DOCUMENTS

| | | | | |
|---|---|---|---|---|
| 5,528,731 A | * | 6/1996 | Sachs et al. | 704/246 |
| 5,699,449 A | * | 12/1997 | Javidi | 382/156 |
| 6,301,370 B1 | | 10/2001 | Steffens et al. | 382/103 |
| 6,345,109 B1 | | 2/2002 | Souma et al. | 382/118 |

OTHER PUBLICATIONS

Lin, Shang- Hung et al, "Face Recognition/Detection by Probabilistic Decision- Based Neural Network", Jan. 1997, IEEE Transactions on Neural Networks, vol. 8. No 1, p. 114-131.*

Moghaddam et al., "Beyond eigenfaces: Probabilistic matching for face recognition" Proc. of Int'l Conf. on Automatic Face and Gesture Recognition, pp. 30-35, Apr. 1998.

* cited by examiner

Primary Examiner—Mark Zimmerman
Assistant Examiner—Kathleen Yuan
(74) Attorney, Agent, or Firm—Dirk Brinkman; Andrew J. Curtin

(57) ABSTRACT

A method recognizes an object in an image. Gallery images include identified objects, and a probe image includes an unidentified object. The probe image is paired with each gallery image to generate pairs of images. First filters are applied to the probe image of each pair to obtain a first feature value for each application of each filter. Second filters are applied to the each gallery image of each pair to obtain a second feature value for each application of each filter. The feature values are summed for each application of each filter, and for each application, a score is set to an acceptance weight if the sum is greater than a predetermined threshold, and otherwise setting the score to a rejection weight. The scores are summed for all of the application, and the probe image is identified with any gallery image when the score is greater than zero.

8 Claims, 2 Drawing Sheets

OBJECT RECOGNITION SYSTEM

FIELD OF THE INVENTION

The present invention relates generally to pattern and object recognition, and more particularly to recognizing human faces in still and moving images.

BACKGROUND OF THE INVENTION

The most visually distinguishing feature of a person is the face. Therefore, face recognition in still and moving images (videos) is an important technology for many applications where it is desired to identify a person from images. Face recognition presents an extremely difficult challenge for computer vision technology.

For example, in facial images acquired by surveillance cameras, the lighting of a scene is often poor and uncontrolled, and the cameras are generally of low quality and usually distant from potentially important parts of the scene. The location and orientation of the faces in the scene can usually not be controlled. Some facial features, such as the hairline, eyebrows, and chin are easily altered. Other features, such as the mouth are highly variable, particularly in a video.

Face recognition compares an image of an unidentified face (a probe image) with a set of images of identified faces (gallery images). The gallery can include multiple images of the same face. The comparison permits two possible outcomes: the probe and gallery images are of the same face, or the probe and gallery images are of different faces.

Probabilistically, these two outcomes can be expressed as P(SAME|D) and P(DIFFERENT|D), where D represents the datum, a particular sample pair from the probe/gallery distribution. Using Bayes law, a conditional probability can be expressed as:

$$P(SAME \mid D) = \frac{P(D \mid SAME)P(SAME)}{P(D \mid SAME)P(SAME) + P(D \mid DIFFERENT)P(DIFFERENT)}.$$

The conditional probability P(DIFFERENT|D) can be expressed similarly, or as=1−P(SAME|D), see Duda et al., "Pattern classification and scene analysis," Wiley, New York, 1973.

Then, the quantities P(SAME|D) and P(DIFFERENT|D) can be compared to determine whether the probe image is the same as one of the gallery images, or not. To recognize from among a large number of faces, one maximizes P(SAME|D) over all the images.

Some face recognition systems are based on principal component analysis (PCA) or the Karhunen-Loeve expansion. U.S. Pat. No. 5,164,992, "Face Recognition System" issued to M. A. Turk et al. on Nov. 17, 1992 describes a system where a matrix of training vectors is extracted from images and reduced by PCA into a set of orthonormal eigenvectors and associated eigenvalues, which describes the distribution of the images. The vectors are projected onto a subspace. Faces are recognized by measuring the Euclidean distance between projected vectors. The problem with the PCA approach is that variations in the appearance of specific features, such as the mouth, cannot be modeled.

Costen et al. in "Automatic Face Recognition: What Representation?," Technical Report of The Institute of Electronics, Information and Communication Engineers (IEICE), pages 95–32, January 1996, describe how the recognition accuracy can be raised by using the Mahalanobis distance. A modified Mahalanobis distance method is described by Kato et al. in "A Handwritten Character Recognition System Using Modified Mahalanobis distance," Transaction of IEICE, Vol. J79-D-II, No. 1, pages 45–52, January 1996. They do this by adding a bias value to each eigenvalue.

Moghaddam et al. describe a probabilistic face recognition in U.S. Pat. No. 5,710,833, "Detection, recognition and coding of complex objects using probabilistic eigenspace analysis" issued to on Jan. 20, 1998, and Moghaddam et al., "Beyond eigenfaces: Probabilistic matching for face recognition" Proc. of Int'l Conf. on Automatic Face and Gesture Recognition, pages 30–35, April 1998.

They describe a system for recognizing instances of a selected object or object feature, e.g., faces, in a digitally represented scene. They subtract the probe image from each gallery image to obtain a difference image. The distribution of difference images, P(D|SAME) and P(D|DIFFERENT), are then modeled as Gaussian probability density functions.

The key weakness of that method is that the Gaussian models of difference images are very restrictive. In practice two images of the same face can vary with lighting and facial expression, e.g., frowning or smiling. To get useful difference images, the probe and gallery images must be very similar, e.g., a frontal probe image cannot be compared with a profile gallery image of the same face. In addition, their method does not accommodate motion of facial features, such as the mouth, and thus, is not well suited to being used on videos.

Another face recognition technique uses a deformable mapping. Each gallery image is pre-processed to map it to an elastic graph of nodes. Each node is at a given position on the face, e.g. the corners of the mouth, and is connected to nearby nodes. A set of local image measurements (Gabor filter responses) are made at each node, and the measurements are associated with each node. The probe and gallery images are compared by placing the elastic graph from each gallery image on the probe image.

However, facial features often move as a person smiles or frowns. Therefore, the best position for a node on the probe image is often different than on the gallery image. As an advantage, the elastic graph explicitly handles facial feature motion. However, it is assumed that the features have the same appearance in all images. The disadvantage of that approach is that there is no statistical model for allowed and disallowed variations for same versus different.

Viola and Jones, in "Rapid Object Detection using a Boosted Cascade of Simple Features," Proceedings IEEE Conf. on Computer Vision and Pattern Recognition, 2001, describe a new framework for detecting objects such as faces in images. They present three new insights: a set of image features which are both extremely efficient and effective for face detection, a feature selection process based on Adaboost, and a cascaded architecture for learning and detecting faces. Adaboost provides an effective learning algorithm and strong bounds on generalized performance, see Freund et al., "A decision-theoretic generalization of on-line learning and an application to boosting," Computational Learning Theory, Eurocolt '95, pages 23–37. Springer-Verlag, 1995, Schapire et al., "Boosting the margin: A new explanation for the effectiveness of voting methods," Proceedings of the Fourteenth International Conference on Machine Learning, 1997, Tieu et al., "Boosting image retrieval," International Conference on Computer Vision, 2000. The Viola and Jones approach provides an extremely efficient technique for face detection but does not address the problem of face recognition, which is a more complex process.

Therefore, there is a need for a face recognition system that improves upon the prior art.

SUMMARY OF THE INVENTION

A method recognizes an object in an image. Gallery images include identified objects, and a probe image includes an unidentified object. The probe image is paired with each gallery image to generate pairs of images.

First filters are applied to the probe image of each pair to obtain a first feature value for each application of each filter. Second filters are applied to the each gallery image of each pair to obtain a second feature value for each application of each filter.

The feature values are summed for each application of each filter, and for each application, a score is set to an acceptance weight if the sum is greater than a predetermined threshold, and otherwise setting the score to a rejection weight.

The scores are summed for all of the application, and the probe image is identified with any gallery image when the score is greater than zero.

DETAILED DESCRIPTION OF THE PREFERRED EMBODIMENT

Figure 1:
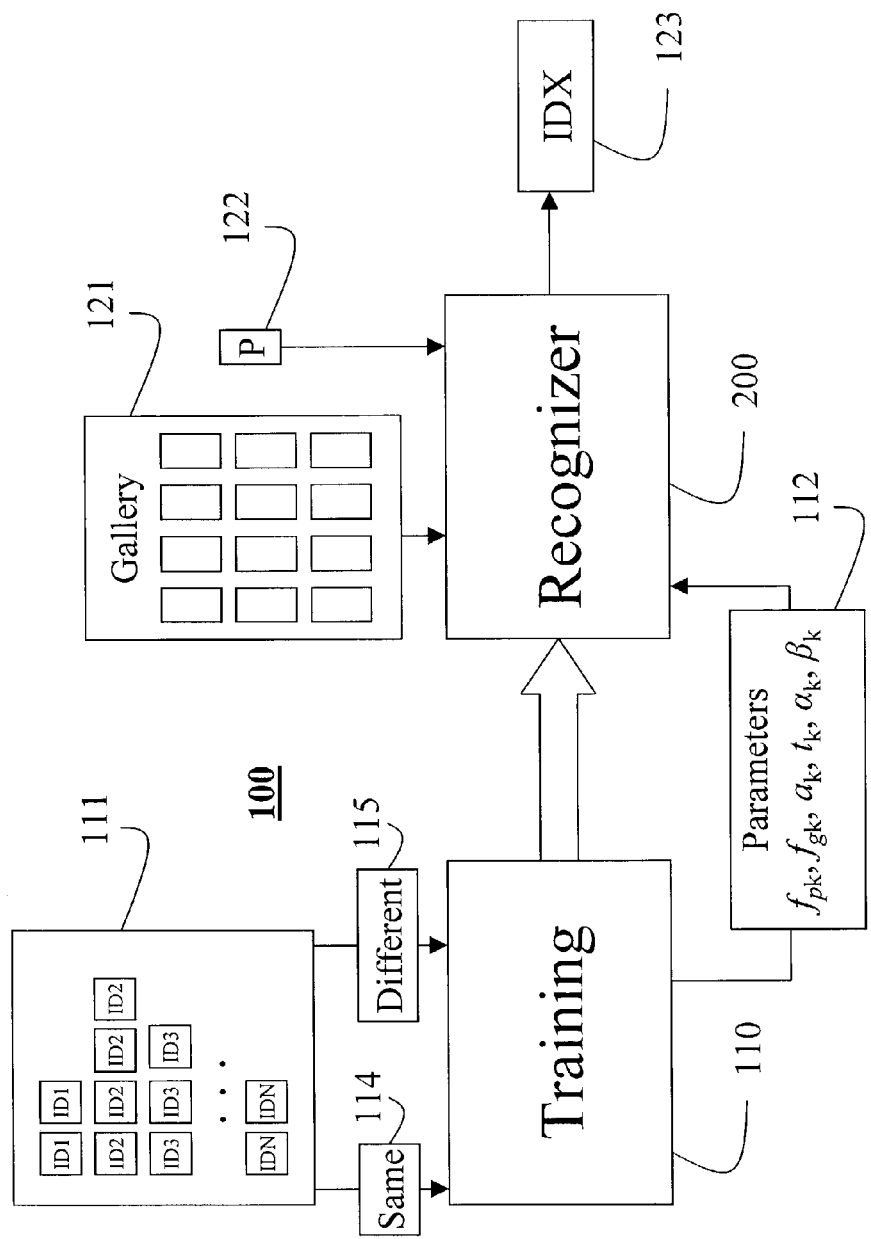
FIG. 1 is a block diagram of an object recognition system and method according to the invention.

FIG. 1 shows a system and method 100 for recognizing objects in images I according to the invention. In one application, the objects recognized in the images are faces, however, it should be understood that other objects (e.g. cars, pedestrians, etc.) can also be recognized.

The system 100 includes two fundamental phases, training 110 and recognizing 200. The training phase 110 takes as input a gallery of labeled training images 111. The nature of what is labeled in the images 111 determines what objects are recognized. For face recognition, the training gallery 111 can include multiple images for each identified person (object) (ID1-IDN). The training images 111 are processed during training to produce parameters ($f_{pk}$, $fg_k$, $\alpha_k$, $t_k$, $\alpha_k$, $\beta_k$); k=1, . . . , N 112, described in greater detail below. The training 110 uses machine learning to find an optimal set of parameters that can be used by the recognizer 200.

The recognizer 200 is provided as input with a gallery of images 121, where each image in the gallery is a face of an identified person, and a probe image 122 of an unidentified person. The images in the galleries 111 and 121 can be the same or completely different. The recognizer 200 uses the parameters 112 to determine, if possible, an identity (IDX) 123 associated with the probe image 122.

Pre-Processing: Face Detection

Figure 2:
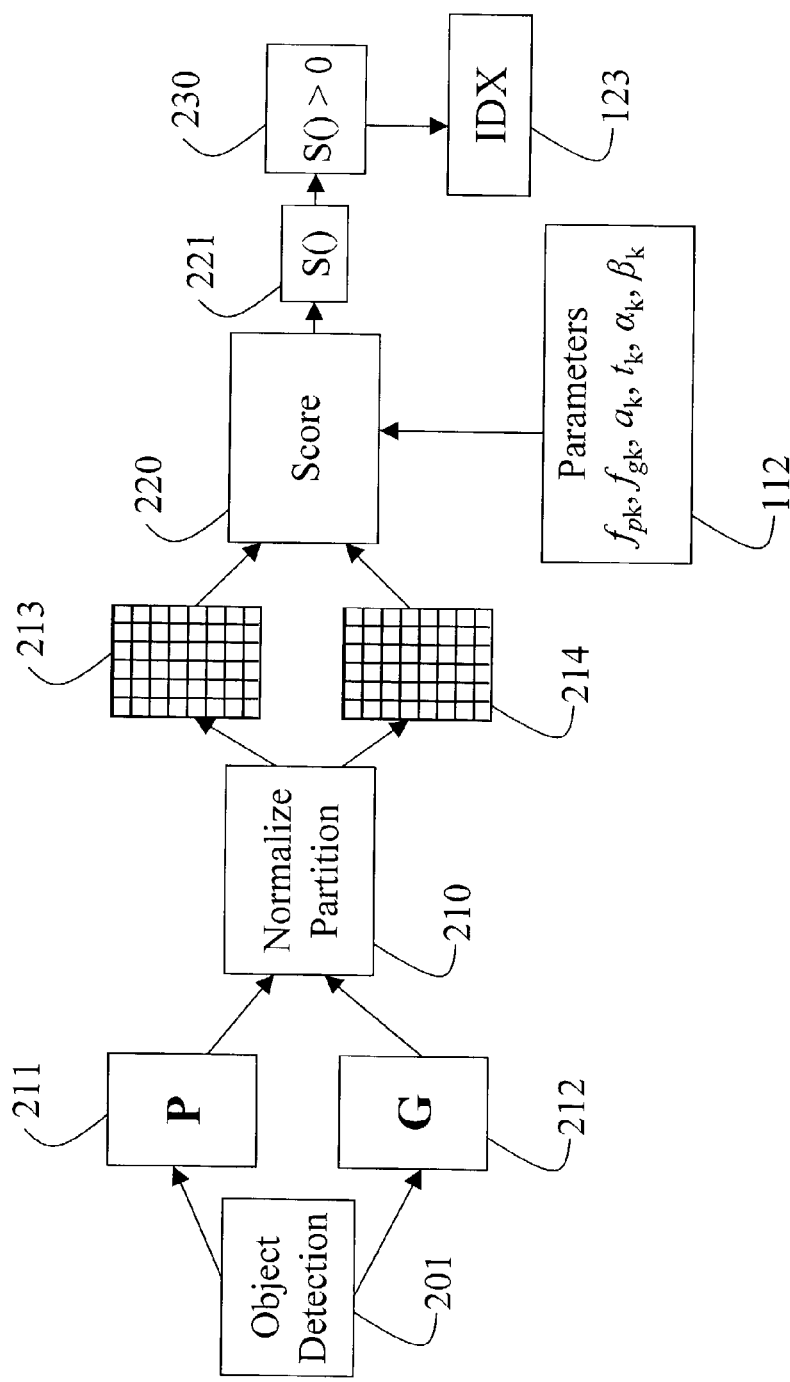
FIG. 2 is a block diagram of a comparison procedure used by the system according to the invention.

The invention is not concerned with how the images of the objects (faces) are obtained, i.e., how faces are detected. Prior art object detection techniques 201 can be used, as shown in FIG. 2. However, for real-time applications, the preferred embodiment uses a face detection method and system as described in U.S. patent application Ser. No. 10/200,464, "System and Method for Detecting Objects in Images," by Viola et al., filed herewith, and incorporated herein in its entirety. The present invention can also use comparison, acceptance, and rejection thresholds described therein.

Pre-Processing: Normalization

As an option, the faces in pairs of images (P and G) 211–212 to be compared can be normalized 210 with respect to size and orientation. For example, the faces can almost fill the image, and be vertically and horizontally aligned. However, it should be understood that the system according to the invention can compare a profile view image with a frontal view image having different sizes.

It should also be noted that many prior art face recognition systems first remove from consideration easy-to-alter facial features such as hair. This is not necessary with the present invention.

Feature Evaluation and Scoring

During recognition 200, the image 213 is a probe image 122, and the image 214 is one of the gallery images 121. Multiple filters are applied to portions (patches) of pairs of images 213–214. The filters can be template filters that are the same size and location as the patches. For example, rectangular features, similar to Haar basis functions, can be used, see Papageorgiou et al., "A general framework for object detection," *International Conference on Computer Vision*, 1998, and Viola and Jones, cited above, and also see Webb et al., "Shape and correspondence," *Computer Vision, Graphics, and Image Processing*, 21:145–160, 1983. It should be noted, that the present invention is not restricted to these types of filters. In the preferred embodiment, the number of features can exceed hundreds of thousands.

The applications of the filters produces 220 a score S( ) 221. The score S( ) is constructed as a sum of features computed from the pair of input images. For example, during recognition the score 221 is:

$$S(P, G_i) = \Sigma_k H_k(P, G_i),$$

where the image P 213 is the probe image 122 of FIG. 1, and the image $G_i$ 214 is one of the gallery images 121, and $H_k$ is the feature obtained due to the application of the $k^{th}$ filter to the images. If S( ) is greater than zero 230, then the images P and $G_i$ are of the same person with the identity IDX 123.

Each feature $H_k(P, G_i)$ has two main components: a function of the probe image 213, $f_{pk}(P)$, and function of the gallery image $f_{gk}(G)$ 214.

A value $v_k = f_{pk}(P) + \alpha_k f_{gk}(G)$ is determined, where $\alpha_k$ is a weight. The value $v_k$ is compared to a comparison threshold $t_k$. If $v_k > t_k$, then $H_k(P, G_i) = \alpha_k$ otherwise $\beta_k$. The functions $f( )$ can be linear or non-linear. For example, the function $f( )$ can be a dot product between the image and a filter template expressed as vectors. The value of the dot products can be modified by a non-linear function, such as an absolute value.

Unlike many prior art approaches, the functions $f_{pk}(P)$ and $f_{gk}(G)$ may depend on only a portion of the input images. In other words, they can be local functions instead of global ones. This allows the recognizer 200 to ignore regions of the face that do not contain stable features such as the mouth region if that is found to be advantageous during the training process.

Training

The training 110 takes as input a set 114 of pairs of images of the same faces, and a set 115 of pairs of images of different faces. Feature selection is similar to the method described for object detection by Viola and Jones. Training proceeds in rounds. Each training example, which is a pair images, is assigned a weight w. The initial weights are typically uniform. On the first round the parameters ($f_{p1}$, $fg_1$, $a_1$, $t_1$, $\alpha_1$, $\beta_1$). which result in the best feature is selected. The best feature maximizes a simple function of the feature's "error."

One possible measure of error is: $\Sigma_j \Sigma_i [w_{ij} H(P_j, G_i) * y_{ij}]$, where $y_{ij} = +1$ if the faces in the images $P_i$ and $G_j$ are the same person, else −1, and $w_{ij}$ is the weight on the example which is probe i and gallery image j. Another possibility is the exponential loss $\Sigma_j \Sigma_i \exp[-w_{ij} * H(P_j, G_i) * y_{ij}]$.

In the next round, the weight w is increased for pairs of images that are incorrectly identified, and decreased for correctly identified pairs. This process of selecting the best feature according to the current weights and then reweighting according to the current errors is repeated until either a predetermined number of features have been selected, or until the training error is below some predetermined threshold.

There are several advantages to this approach. Important differences between faces are learned directly. For example, it is common for a person to raise their eyebrows, but only to some extent. The filters $f_{pk}$ and $f_{gk}$ can focus on the corresponding features of a face and can capture the acceptable variations. For example, if $f_{pk}$ and $f_{gk}$ are filters that measure the position of the left eyebrow then $t_k$ determines the acceptable variations.

The prior art PCA approaches would be forced to model this type of variation as a linear combination of pairs of images, which is not possible in the low dimensional subspaces typically employed. Unimportant differences can be explicitly ignored. Because the training of the features is done both with positive (SAME pairs 114) and negative examples (DIFFERENT pairs 114), the features selected by this process ignores characteristics of the face which are highly variable, such as the shape of mouths, and focus on important characteristics, such as the shape of the eyes and nose.

The system can be trained to recognize objects in spite of their images being in different poses. The system can be trained to recognize one pose (like ¾ probe images) from another (like frontal gallery images). The filters selected during training automatically compare equivalent facial features even if they appear in different locations.

Multiple galleries 121 can be used simultaneously. For example, the probe image is ¾ profile, and the gallery 121 contains images of frontal and profile views. For some facial features, better results can be obtained when the ¾ probe image is compared with a frontal gallery image where eyes are more visible, e.g., to distinguish the shape of the eyes. For other images, it is best to compare the ¾ probe image to the profile gallery image, e.g., to distinguish the shape of the ear.

It should be noted that the object recognition system also can use acceptance and rejection thresholds as described by Viola and Jones, to accelerate the rate of processing.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for recognizing an object in an image, comprising:
   providing a plurality of gallery images, each gallery image including an identified object;
   pairing each gallery image with a probe image of an unidentified object to generate a plurality of pairs of images;
   applying a first set of template filters to the probe image of each pair to obtain a first feature value for each application of each template filter, and applying a second set of template filters to the each gallery image of each pair to obtain a second feature value for each application of each template filter;
   summing, for each application of each template filter, the first and second feature values;
   setting, for each application, a score to an acceptance weight if the sum is greater than a predetermined threshold, and otherwise setting the score to a rejection weight;
   summing the scores for all of the applications; and
   identifying the probe image with any gallery image when the score is greater than zero.

2. The method of claim 1 wherein the object is a face.

3. The method of claim 1 further comprising:
   normalizing the images with respect to size and orientation.

4. The method of claim 1 wherein different views are used for the identified object and the unidentified object.

5. The method of claim 1 wherein the filters are non-linear functions.

6. The method of claim 1 wherein the filters are local functions applied to a portion of the images.

7. The method of claim 1 wherein multiple sets of gallery images are provided, each set using a different view of the objects.

8. A system for recognizing an object in an image, comprising:
   a plurality of gallery images, each gallery image including an identified object;
   a probe image of an unidentified object, the probe image to be paired with each gallery image to generate a plurality of pairs of images;
   means for applying a first set of template filters to the probe image of each pair to obtain a first feature value for each application of each template filter;
   means for applying a second set of template filters to the each gallery image of each pair to obtain a second feature value for each application of each template filter;
   means for summing, for each application of each template filter, the first and second feature values;
   means for setting, for each application, a score to an acceptance weight if the sum is greater than a predetermined threshold, and otherwise setting the score to a rejection weight;
   means for summing the scores for all of the applications; and
   means for identifying the probe image with any gallery image when the score is greater than zero.

* * * * *